(12) United States Patent
Bez et al.

(10) Patent No.: US 10,228,777 B2
(45) Date of Patent: Mar. 12, 2019

(54) MANUAL DEVICE AND MULTIFUNCTIONAL ASSEMBLY

(71) Applicant: SOCIETE BIC, Clichy (FR)

(72) Inventors: Arnaud Bez, Garches (FR); David Boisdevesys, Vitry sur Seine (FR)

(73) Assignee: SOCIETE BIC, Clichy (FR)

( * ) Notice: Subject to any disclaimer, the term of this patent is extended or adjusted under 35 U.S.C. 154(b) by 31 days.

(21) Appl. No.: 15/103,706

(22) PCT Filed: Dec. 10, 2014

(86) PCT No.: PCT/FR2014/053255
§ 371 (c)(1),
(2) Date: Jun. 10, 2016

(87) PCT Pub. No.: WO2015/086992
PCT Pub. Date: Jun. 18, 2015

(65) Prior Publication Data
US 2016/0320869 A1 Nov. 3, 2016

(30) Foreign Application Priority Data
Dec. 10, 2013 (FR) ...................................... 13 62375

(51) Int. Cl.
*G06F 3/044* (2006.01)
*G06F 3/0354* (2013.01)
(Continued)

(52) U.S. Cl.
CPC .......... *G06F 3/03545* (2013.01); *B43K 23/10* (2013.01); *B43K 23/124* (2013.01); *B43K 29/00* (2013.01); *G06F 3/044* (2013.01)

(58) Field of Classification Search
CPC ............................ G06F 3/03545; G06F 3/044
(Continued)

(56) References Cited

U.S. PATENT DOCUMENTS 5,747,748 A * 5/1998 Zigler ................... B43K 23/10
178/18.01
6,439,791 B1 * 8/2002 Takeuchi ............... B43K 23/08
401/109

(Continued)

FOREIGN PATENT DOCUMENTS

WO 2012/156090 A1 11/2012
WO 2013091182 A1 6/2013

OTHER PUBLICATIONS

International Search Report dated Oct. 30, 2015 from International Application No. PCT/FR2014/053255, 7 pages.
Written Opinion dated Oct. 30, 2015 from International Application No. PCT/FR2014/053255, 8 pages.

*Primary Examiner* — Jason M Mandeville
(74) *Attorney, Agent, or Firm* — Ohlandt, Greeley, Ruggiero & Perle, L.L.P

(57) ABSTRACT

The disclosure relates to the field of manual devices for interacting with capacitive screens, and more particularly to a manual device with an open first end suitable for receiving a rear end of a writing instrument in a longitudinal direction, and a second end that is opposite from the first end in the longitudinal direction and that is provided with an electrically-conductive pad. Between the first and second ends, the manual device comprises an external portion made of elastomer and an internal structure that is electrically conductive, said internal structure forming an electrical connection between said pad and at least one conductive surface of the internal structure passing through an opening to be exposed on a grip surface of said external portion.

16 Claims, 4 Drawing Sheets

(51) Int. Cl.
*B43K 29/00* (2006.01)
*B43K 23/10* (2006.01)
*B43K 23/12* (2006.01)

(58) Field of Classification Search
USPC .......................................................... 345/179
See application file for complete search history.

(56) References Cited

U.S. PATENT DOCUMENTS

| | | | |
|---|---|---|---|
| 8,915,663 B2* | 12/2014 | Rolion | B43K 29/02 |
| | | | 15/433 |
| 2003/0076310 A1* | 4/2003 | Kanzaki | G06F 3/03545 |
| | | | 345/179 |
| 2004/0154172 A1 | 8/2004 | Tatz | |
| 2007/0110496 A1* | 5/2007 | Cetera | B43K 23/008 |
| | | | 401/6 |
| 2011/0216044 A1* | 9/2011 | Yuan | G06F 3/033 |
| | | | 345/179 |
| 2011/0273376 A1 | 11/2011 | Dickinson et al. | |
| 2012/0194484 A1 | 8/2012 | Lehman | |
| 2013/0038579 A1* | 2/2013 | Boyd | B43K 7/02 |
| | | | 345/179 |
| 2013/0176284 A1* | 7/2013 | Chuang | G06F 3/044 |
| | | | 345/179 |
| 2013/0191962 A1* | 8/2013 | Alves | G06F 3/039 |
| | | | 2/167 |
| 2014/0035806 A1* | 2/2014 | Oden | G06F 3/039 |
| | | | 345/156 |

* cited by examiner

MANUAL DEVICE AND MULTIFUNCTIONAL ASSEMBLY

BACKGROUND OF THE DISCLOSURE

1. Field of the Disclosure

The invention relates to a manual device having an end fitted with an electrically-conductive pad. On making contact with the surface of a capacitive screen, as used in particular on mobile telephones, multimedia tablets, or other computer devices, such a conductive pad can locally distort the electrostatic field of the screen, which distortion can be detected and located by a data processor device, such as for example a microprocessor, so as to interact with elements of a graphical user interface displayed on the screen.

2. Description of the Related Art

Typically, capacitive screens are intended for use by direct contact with the user's fingers. Nevertheless, in certain utilizations, manual devices analogous to a stylus can be preferable, for example for reasons of accuracy. Such a manual device, such as the device of the present disclosure, may present an electrically-conductive pad.

A drawback of such a dedicated manual device is that it might be additional to other writing instruments of a single user. The term "writing instrument" is used in this context to designate any instrument that can be used to trace writing manually on an appropriate surface. Thus, writing instruments include by way of example:

pencils, pens, ballpoints, or felt tips, and even appropriate styluses. All such writing instruments are typically elongate in shape between a front end presenting a writing tip and a rear end that is opposite therefrom in a longitudinal direction. This elongate shape thus enables a front portion of the writing instrument to be gripped close to the writing tip, between the tips of the thumb and at least one of the index and middle fingers, while a rear portion is supported in the grip corner between the thumb and the index finger in order to stabilize the writing instrument in the hand. Unfortunately, the space occupied by all of these tools together is a significant drawback for the user.

SUMMARY OF THE DISCLOSURE

The invention seeks to remedy those drawbacks. In particular, the present disclosure seeks to propose a manual device fitted with an electrically-conductive pad and capable of being fastened easily on the rear end of another writing instrument in order to form an ergonomic multifunctional assembly.

In such a manual device according to at least one embodiment of the invention, this object is achieved in that the manual device, which presents an open first end suitable for receiving a rear end of a writing instrument in a longitudinal direction, and a second end that is opposite from the first end in the longitudinal direction and that is provided with an electrically-conductive pad, comprises, between the first and second ends, an external portion made of elastomer and an internal structure that is electrically conductive, said internal structure forming an electrical connection between said pad and at least one conductive surface of the internal structure passing through an opening to be exposed on a grip surface of said external portion. In this context, "exposed" should be understood broadly, as implying that the conductive surface of the internal structure is accessible for touching through the opening. In contrast, this does not mean that the conductive surface of the internal structure is necessarily at exactly the same level as the grip surface around the opening: the conductive surface of the internal structure may be at the same level, or it may be set back at least a little, and/or it may project at least a little relative to the grip surface around the opening.

By means of these provisions, the manual device is made to be radially flexible, thereby enabling writing instruments of various diameters and sections to be engaged by force into the manual device through its first end. The internal structure reinforces the device while providing electrical contact between the pad and the user's fingers, which contact serves to better reproduce the electrostatic field distortion of a capacitive screen as is caused by direct contact with the fingers of the user, which electrical contact would otherwise be difficult to establish through the elastomer material of the external portion, which nevertheless provides a grip surface that is particularly agreeable and ergonomic.

In order to ensure that the cost of producing said internal structure is limited, it may be made of polymer filled with electrically-conductive particles. The polymer may in particular be a thermoplastic. For better effectiveness, the particles may in particular be nanoparticles. For manufacturing to be fast and inexpensive, said main body may be produced by injection molding. By using a thermoplastic elastomer for the external portion, it can easily be overmolded around the internal structure.

In order to provide the radial flexibility of the internal structure, it may comprise at least one pair of elements connected together by at least one angled flexible strip. Since such an angled flexible strip can bend about two distinct axes, it allows relative movement between the two elements of the pad. In particular, the internal structure may comprise an endpiece adjacent to the pad and a pair of elements, each having two parallel branches extending in the longitudinal direction, the two branches of each of these two elements being connected to said endpiece by a respective common base, one branch of a first element of said pair being connected to one branch of a second element of said pair by an angled flexible strip, the other branch of the first element being connected to the other branch of the second element by another angled flexible strip, and the two branches of the first element also being connected together by a flexible strip beside the first end of the device. Such a configuration for the internal structure makes it possible to optimize its radial flexibility so as to enable writing instruments of a wide variety of sections and diameters to be engaged by force inside the manual device.

The present disclosure also relates to a multifunctional assembly comprising such a manual device and a writing instrument with a front end presenting a writing tip and a rear end engaged by force through the first end of the manual device.

BRIEF DESCRIPTION OF THE DRAWINGS

The invention can be well understood and its advantages appear better on reading the following detailed description of embodiments given as non-limiting examples. The description refers to the accompanying drawings, in which.

DETAILED DESCRIPTION OF THE DISCLOSURE

Figure 1:
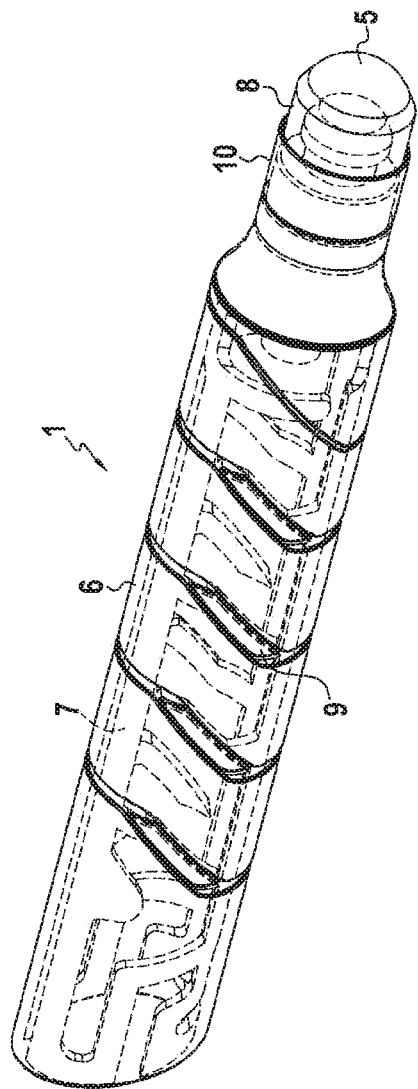
FIG. 1 is a perspective view of a manual writing device in a first embodiment.

FIG. 1 shows a manual device 1 in the form of an elongate cap extending in a longitudinal direction between an open first end and a second end that presents a flexible pad 5 that is electrically conductive, e.g. made of silicone polymer filled with carbon black.

The manual device 1 has an elastomer external portion 6 overmolded around an internal structure 7, and a connector 8 that connects the internal structure 7 to the flexible pad 5. A ring 10 protects the base of the connector 8. The connector 8 and the internal structure 7 may be electrically conductive so as to form an electrical connection between the flexible pad 5 and conductive surfaces 9 of the internal structure 7 that pass through corresponding openings to be exposed on a grip surface of the external portion 6. In order to obtain this electrical conductivity, the connector 8 is made of silicone polymer filled with conductive particles, e.g. carbon nanotubes having a diameter of about 9.5 nanometers (nm) and a length of about 1.5 micrometers (µm), and the internal structure 7 may be made of a material such as a thermoplastic polymer likewise filled with conductive particles, and more particularly with carbon nanotubes having a diameter of 9.5 nm and a length of 1.5 µm. The use of such a polymer also enables mass production to be performed inexpensively by injection molding. Because of the conductive surfaces 9, the external portion 6 may be made of a dielectric material, e.g. a conventional thermoplastic elastomer that is also suitable for being overmolded around the internal structure 7.

Figure 2A:
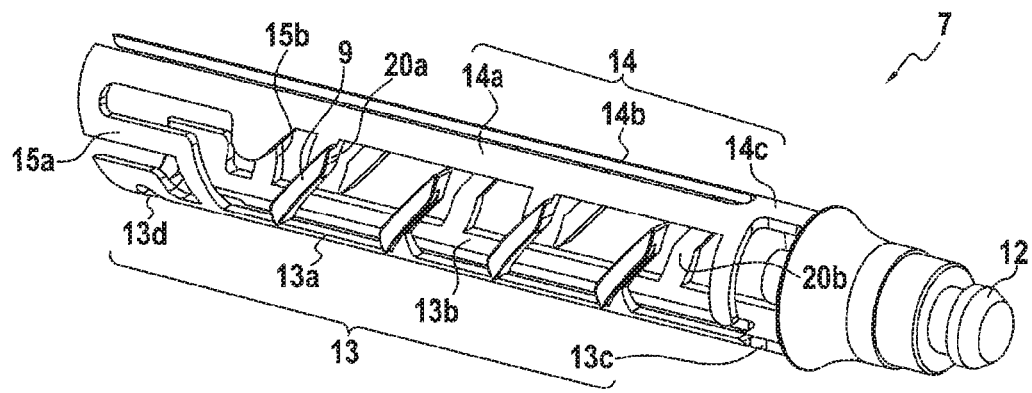
FIG. 2A to 2C are different perspective views of the internal structure of the FIG. 1 manual device.
Figure 2B:
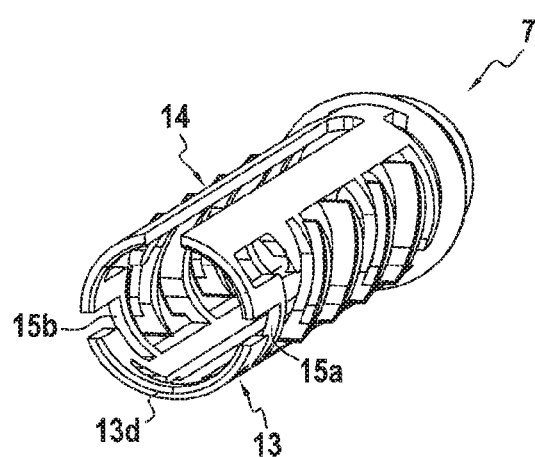
Figure 2C:
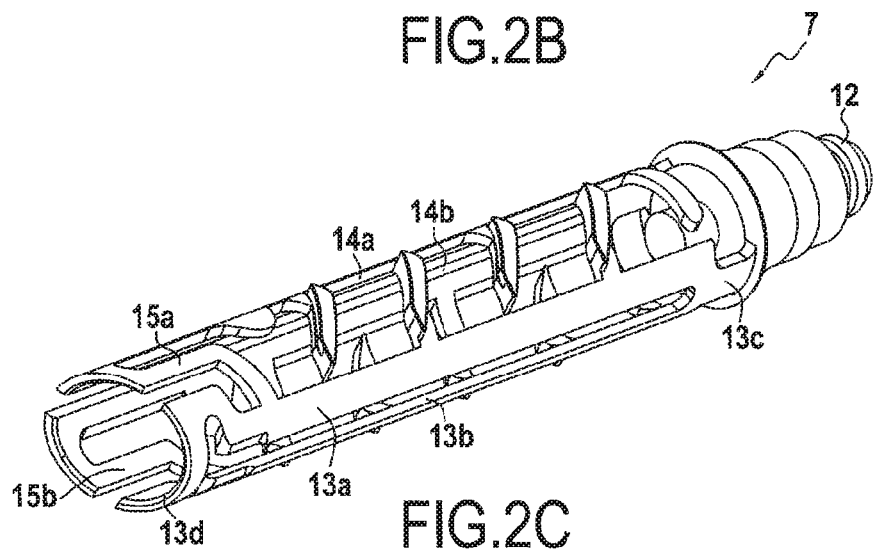

Whereas the elastomer material of the internal portion 6 is comparatively flexible, in particular in order to make the manual device 1 more agreeable to the touch, the elastomer material of the internal structure 7 is normally more rigid. The internal structure 7 thus presents a geometrical configuration that serves to increase its radial flexibility, thereby making it easier to engage a writing instrument by force into the manual device 1. Thus, as shown in particular by FIGS. 2A to 2C, the internal structure 7 presents a particular shape that is designed to provide a large amount of radial flexibility. More specifically, this internal jacket 7 comprises an endpiece 12 and a pair of elements 13 and 14, each of which presents two parallel branches extending in the longitudinal direction. The endpiece 12 is adjacent to the pad 5 and presents an annular groove 13 for anchoring the connector 8. The two branches 13a and 13b of the first element 13 are connected to the endpiece 12 by a common base 13c that is narrower, giving this first element 13 a tuning-fork shape. In the same manner, the two branches 14a and 14b of the second element 14 are also connected to the endpiece 12 by a narrower common portion 14c, giving this second element a similar tuning-fork shape. At the other end of the internal jacket 7, the branch 13a of the first element 13 is connected to the branch 14a of the second element 14 by an angled flexible strip 15a, and the branch 13b of the first element 13 is connected to the branch 14b of the second element 14 by another angled flexible strip 15b. Finally, the two branches 13a and 13b of the first element 13 are also connected together at the end opposite from their common base 13c by a flexible strip 13d, unlike the two branches 14a and 14b of the second element.

In the embodiment shown, the conductive surfaces 9 are situated between the first element 13 and the second element 14. More specifically, they are situated between the branch 13a of the first element 13 and the branch 14a of the second element 14 on arms 20a extending in alternation from the branch 13a and from the branch 14a and, between the branch 13b of the first element 13 and the branch 14b of the second element 14, they are situated on arms 20b extending in alternation from the branch 13b and from the branch 14b.

Figure 3:
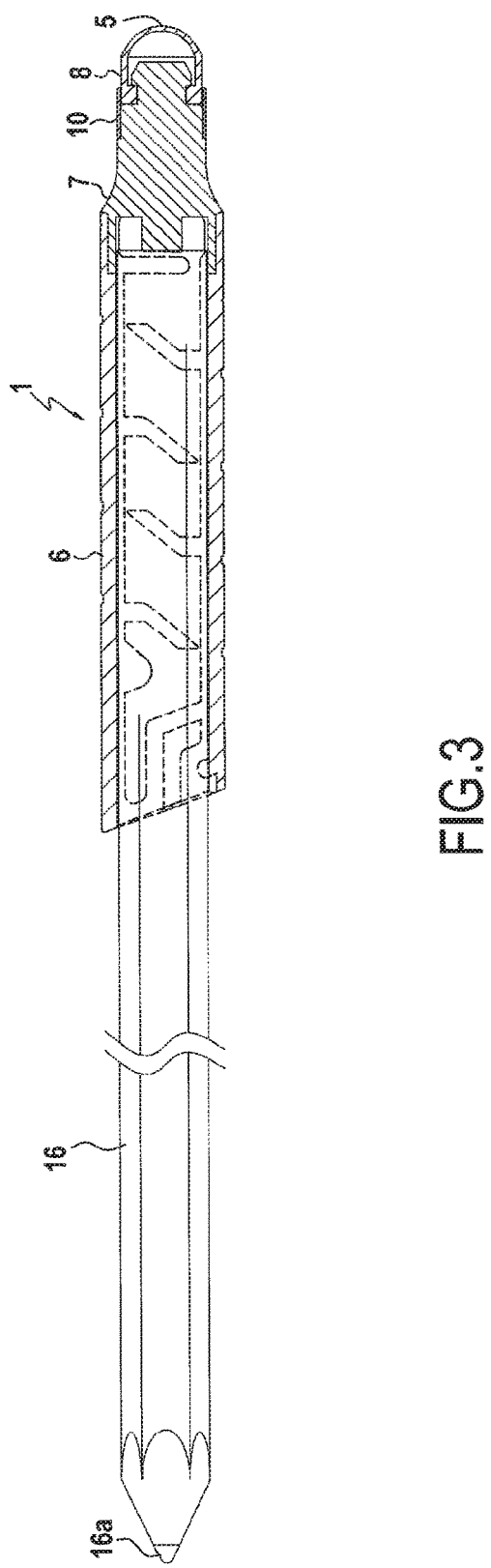
FIG. 3 is a longitudinal section of a multifunctional assembly formed by the FIG. 1 manual device and a writing instrument engaged by force in the manual device.

Each of the straight segments of the flexible strips 15a, 15a, and 13d and the base 13c of the first segment 13 and the base 14c of the second segment 14 introduces a point of inflection about a different axis, this configuration serving to optimize the radial flexibility of the internal structure 7 in order to make it easier to engage the rear end of a writing instrument 16 that presents a writing tip 16a at its front end by force into the inside of the internal structure 7, as shown in particular in FIG. 3.

Figure 4:
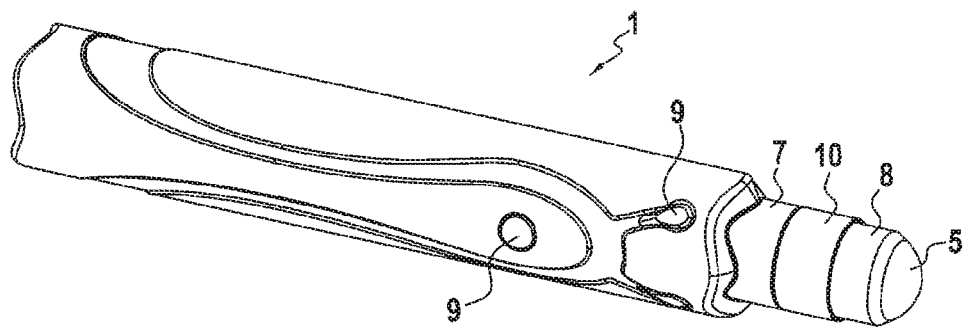
FIGS. 4 and 5 are perspective views of manual devices in alternative embodiments.
Figure 5:
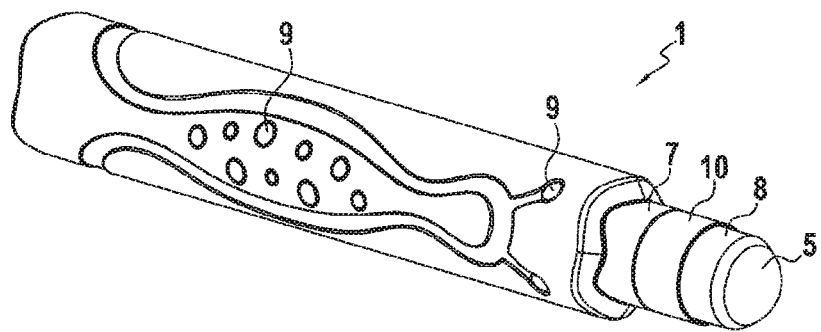

Such a manual device may be made in numerous different forms, in particular concerning the configuration of the grip surface and of the conductive surfaces that are flush through orifices in the grip surface. FIGS. 4 and 5 show two other embodiments with such alternative configurations. Elements that are analogous or equivalent to those of the first embodiment are given the same reference numbers in these two figures.

Although the invention is described with reference to a specific embodiment, it is clear that various modifications and changes may be made to these examples without going beyond the general ambit of the invention as defined by the claims. In particular, individual characteristics of the various embodiments mentioned may be combined in additional embodiments. Consequently, the description and the drawings should be considered in a sense that is illustrative rather than restrictive.

The invention claimed is:

1. A manual device comprising:
an electrically conductive internal structure having a conductive surface projecting outwardly therefrom;
an external portion made of elastomer being around the electrically conductive internal structure so that a portion of the electrically conductive internal structure is inside the external portion, the external portion has an opening from an innermost surface to an outermost surface of the external portion, the conductive surface of the electrically conductive internal structure passing through the opening to expose the conductive surface on a grip portion of the outermost surface of the external portion,
wherein the electrically conductive internal structure and the external portion form an elongate cap capable of being fastened on a rear end of a writing instrument having a writing tip and an opposite rear end, and the electrically conductive internal structure and the external portion each have a corresponding open first end for receiving the opposite rear end of the writing instrument and a second end that is opposite from the open first end, the second end having an electrically-conductive pad, and wherein the electrically conductive internal structure is connected to the electrically-conductive pad forming an electrical connection between the electrically-conductive pad and the conductive surface of the electrically conductive internal structure.

2. The manual device according to claim 1, wherein the electrically conductive internal structure is made of polymer filled with conductive particles.

3. The manual device according to claim 2, wherein the conductive particles are nanoparticles.

4. A multifunctional assembly comprising a manual device of claim 3, and the writing instrument is an elongate writing instrument and the opposite rear end of the writing instrument is engaged by force through the open first end.

5. The manual device according to claim 3, wherein the electrically conductive internal structure includes at least one pair of elements connected together by at least one angled flexible strip.

6. A multifunctional assembly comprising a manual device of claim 2, and the writing instrument is an elongate writing instrument and the opposite rear end of the writing instrument is engaged by force through the open first end.

7. The manual device according to claim 2, wherein the electrically conductive internal structure includes at least one pair of elements connected together by at least one angled flexible strip.

8. The manual device according to claim 2, wherein the electrically conductive internal structure further includes an end piece adjacent to the electrically-conductive pad and a pair of elements, each having two parallel branches extending in a longitudinal direction, the two parallel branches of each of these two elements being connected to the end piece by a respective common base, one branch of a first element of the pair being connected to one branch of a second element of the pair by an angled flexible strip, the other branch of the first element being connected to the other branch of the second element by another angled flexible strip, and the two branches of the first element also being connected together by a flexible strip beside the open first end.

9. The manual device according to claim 3, wherein the electrically conductive internal structure further includes an end piece adjacent to the electrically-conductive pad and a pair of elements, each having two parallel branches extending in a longitudinal direction, the two parallel branches of each of these two elements being connected to the end piece by a respective common base, one branch of a first element of the pair being connected to one branch of a second element of the pair by an angled flexible strip, the other branch of the first element being connected to the other branch of the second element by another angled flexible strip, and the two branches of the first element also being connected together by a flexible strip beside the open first end.

10. The manual device according to claim 1, wherein the electrically conductive internal structure includes at least one pair of elements connected together by at least one angled flexible strip.

11. A multifunctional assembly comprising a manual device of claim 10, and the writing instrument is an elongate writing instrument and the opposite rear end of the writing instrument is engaged by force through the open first end.

12. The manual device according to claim 10, wherein the electrically conductive internal structure includes at least one pair of elements connected together by at least one angled flexible strip.

13. The manual device according to claim 1, wherein the electrically conductive internal structure further includes an end piece adjacent to the electrically-conductive pad and a pair of elements, each having two parallel branches extending in a longitudinal direction, the two parallel branches of each of these two elements being connected to the end piece by a respective common base, one branch of a first element of the pair being connected to one branch of a second element of the pair by an angled flexible strip, the other branch of the first element being connected to the other branch of the second element by another angled flexible strip, and the two branches of the first element also being connected together by a flexible strip beside the open first end.

14. A multifunctional assembly comprising a manual device of claim 13, and the writing instrument is an elongate writing instrument and the opposite rear end of the writing instrument is engaged by force through the open first end.

15. A multifunctional assembly comprising a manual device of claim 1, and the writing instrument is an elongate writing instrument and the opposite rear end of the writing instrument is engaged by force through the open first end.

16. The manual device according to claim 1, wherein the conductive surface of the electrically conductive internal structure is a plurality of conductive surfaces and the opening of the external portion is a plurality of openings, and wherein each of the plurality of openings corresponds with a separate one of each of the plurality of conductive surfaces.

* * * * *